US012114267B2

(12) United States Patent
Hu et al.

(10) Patent No.: US 12,114,267 B2
(45) Date of Patent: Oct. 8, 2024

(54) SYSTEMS AND METHODS OF USING RESTRICTED TARGET WAKE TIME IN WIRELESS COMMUNICATION

(71) Applicant: Meta Platforms Technologies, LLC, Menlo Park, CA (US)

(72) Inventors: Chunyu Hu, Saratoga, CA (US); Muhammad Kumail Haider, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 57 days.

(21) Appl. No.: 17/679,909

(22) Filed: Feb. 24, 2022

(65) Prior Publication Data
US 2024/0098647 A1 Mar. 21, 2024

Related U.S. Application Data

(60) Provisional application No. 63/165,474, filed on Mar. 24, 2021.

(51) Int. Cl.
*H04W 28/02* (2009.01)
*H04W 52/02* (2009.01)

(52) U.S. Cl.
CPC ............... *H04W 52/0248* (2013.01)

(58) Field of Classification Search
CPC . H04W 52/0248; H04W 52/02; H04W 74/08; H04W 28/02
See application file for complete search history.

(56) References Cited

U.S. PATENT DOCUMENTS

| 2018/0324638 | A1* | 11/2018 | Chu | H04L 27/2601 |
| 2018/0324707 | A1* | 11/2018 | Sun | H04W 74/08 |
| 2021/0127307 | A1* | 4/2021 | Huang | H04W 16/18 |
| 2021/0195460 | A1* | 6/2021 | Park | H04W 28/0268 |

(Continued)

FOREIGN PATENT DOCUMENTS

WO 2022093892 A1 5/2022

OTHER PUBLICATIONS

Hu C., "Prioritized EDCA Channel Access—Slot Management," IEEE Draft, Feb. 26, 2021 [Retrieved on Feb. 26, 2021], vol. 802.11 EHT; 802.11be, No. 14, pp. 1-22, Retrieved from the Internet: URL: https://mentor.ieee.org/802.11/dcn/20/11-20-1046-14-00be-prioritized-edca-channel-access-slot-management.pptx.

(Continued)

*Primary Examiner* — Jinsong Hu
*Assistant Examiner* — Farideh Madani
(74) *Attorney, Agent, or Firm* — Foley & Lardner LLP

(57) ABSTRACT

Disclosed herein are systems and methods related to using restricted target wake time in wireless communication. In one aspect, a first wireless communication device may configure a first field indicating (i) one or more traffic streams that are latency sensitive, and (ii) a direction of each of the one or more traffic streams between the first wireless communication device and a second wireless communication device. Each of the one or more traffic streams is to be communicated during a respective service period of a restricted target wake time (rTWT) schedule. The first wireless communication device may send a message including the first field to a second wireless communication device.

16 Claims, 10 Drawing Sheets

(56) References Cited

U.S. PATENT DOCUMENTS

2022/0070772 A1* 3/2022 Ho .................. H04W 52/0219

OTHER PUBLICATIONS

IEEE P802.11be™/D0.4., "Draft Standard for Information Technology-Tele-Communications and Information Exchange Between Systems Local and Metropolitan Area Networks-Specific Requirements, Part 11: Wireless LAN Medium Access Control (MAC) and Physical Layer (PHY) Specifications, Amendment 8: Enhancements for extremely high throughput (EHT)," IEEE Draft, Mar. 19, 2021, vol. 802.11, No. D0.4, pp. 1-511, Retrieved from the Internet: URL: https://grouper.ieee.org/groups/802/11/private/Draft_Standards/11be/Draft_P802.11be_D0.4.pdf.

International Search Report and Written Opinion for International Application No. PCT/US2022/021622, mailed Jun. 15, 2022, 11 pages.

* cited by examiner

SYSTEMS AND METHODS OF USING RESTRICTED TARGET WAKE TIME IN WIRELESS COMMUNICATION

CROSS-REFERENCE TO RELATED APPLICATION

This application claims priority to and the benefit of U.S. Provisional Application No. 63/165,474 filed Mar. 24, 2021, entitled "SYSTEMS AND METHODS OF USING RESTRICTED TARGET WAKE TIME IN WIRELESS COMMUNICATION", which is incorporated herein by reference in its entirety for all purposes.

FIELD OF DISCLOSURE

The present disclosure is generally related to communication with certain latency requirements, including but not limited to reducing latency in communication for artificial reality and other applications.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). An image of a virtual object may be generated by a computing device communicatively coupled to the HWD. In some embodiments, the computing device may have access to a network.

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Disclosed herein are systems and methods related to using restricted target wake time (TWT) in wireless communication. Broadcast TWT signaling may be modified/repurposed/appended to allow for restricted TWT set-up such as handshaking/negotiating between a station and an access point. Traffic streams indicated by traffic identifiers in a certain direction (or directions) may be identified as being latency sensitive and prioritized for transmission during a restricted TWT service period.

Some embodiments are related to a method of configuring, by a first wireless communication device, a first field indicating (i) one or more traffic streams that are latency sensitive, and (ii) a direction of each of the one or more traffic streams between the first wireless communication device and a second wireless communication device. Each of the one or more traffic streams may be communicated during a respective service period of a restricted target wake time (rTWT) schedule. The method can include sending, by the first wireless communication device to the second wireless communication device, a message including the first field.

The message may include a second field that is set to a predefined value to indicate that the first field is included in the message. The first field may be for use by the first wireless communication device and the second wireless communication device to negotiate membership in the rTWT schedule. A subfield in the first field may indicate whether one or more additional subfields in the first field include valid information. The subfield may comprise a valid indicator bit corresponding to a subfield of the one or more additional subfields. A subfield in the first field may indicate one or more traffic identifiers corresponding to the one or more traffic streams. The subfield may indicate a direction of the one or more traffic streams. A subfield in the field may comprise a traffic specification element describing one or more characteristics of a first traffic stream of the one or more traffic streams. A subfield in the field may indicate a use of peer-to-peer communication.

Other embodiments are related to a wireless communication device including at least one processor configured to configure a first field indicating (i) one or more traffic streams that are latency sensitive, and (ii) a direction of each of the one or more traffic streams between the first wireless communication device and a second wireless communication device. Each of the one or more traffic streams may be communicated during a respective service period of a restricted target wake time (rTWT) schedule. The wireless communication device may include a transceiver configured to send a message including the first field to the second wireless communication device.

The message may include a second field that is set to a predefined value to indicate that the first field is included in the message. The first field may be for use by the first wireless communication device and the second wireless communication device to negotiate membership in the rTWT schedule. A subfield in the first field may indicate whether one or more additional subfields in the first field include valid information. The subfield may comprise a valid indicator bit corresponding to a subfield of the one or more additional subfields. A subfield in the first field may indicate one or more traffic identifiers corresponding to the one or more traffic streams. The subfield may indicate a direction of the one or more traffic streams. A subfield in the field may comprise a traffic specification element describing one or more characteristics of a first traffic stream of the one or more traffic streams. A subfield in the field may indicate a use of peer-to-peer communication.

Other embodiments are related to a method of receiving, by a second wireless communication device from a first wireless communication device, a message including a first field. The first field may be configured to indicate (i) one or more traffic streams that are latency sensitive, and (ii) a direction of each of the one or more traffic streams between the first wireless communication device and a second wireless communication device. Each of the one or more traffic streams may be communicated during a respective service period of a restricted target wake time (rTWT) schedule. The message may include a second field that is set to a predefined value to indicate that the first field is included in the message.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Streams of traffic across a network may be characterized by different types of traffic. For instance, an application may be characterized by latency sensitive traffic (e.g., video/voice (VI/VO), real time interactive applications, and the like) or regular traffic (e.g., best effort/background applications (BE/BK)). Latency sensitive traffic may be identifiable by its characteristic of periodic bursts of traffic. For instance, video display traffic may be driven by the refresh rate 60 Hz, 72 Hz, 90 Hz, and 120 Hz. An application and/or device may have combinations of traffic types (e.g., latency sensitive traffic and non-latency sensitive traffic).

In some applications, latency sensitive traffic that is not prioritized (or protected) may degrade a user experience. For example, in an AR context, latency between a movement of a user wearing an AR device and an image corresponding to the user movement and displayed to the user using the AR device may cause judder, resulting in motion sickness.

Disclosed herein are related to systems and methods for remotely rendering an artificial reality space (e.g., an AR space, a VR space, or a MR space) by adaptively allocating resources or time slots for communication of data based on utilization and priorities of channel access.

Figure 1:
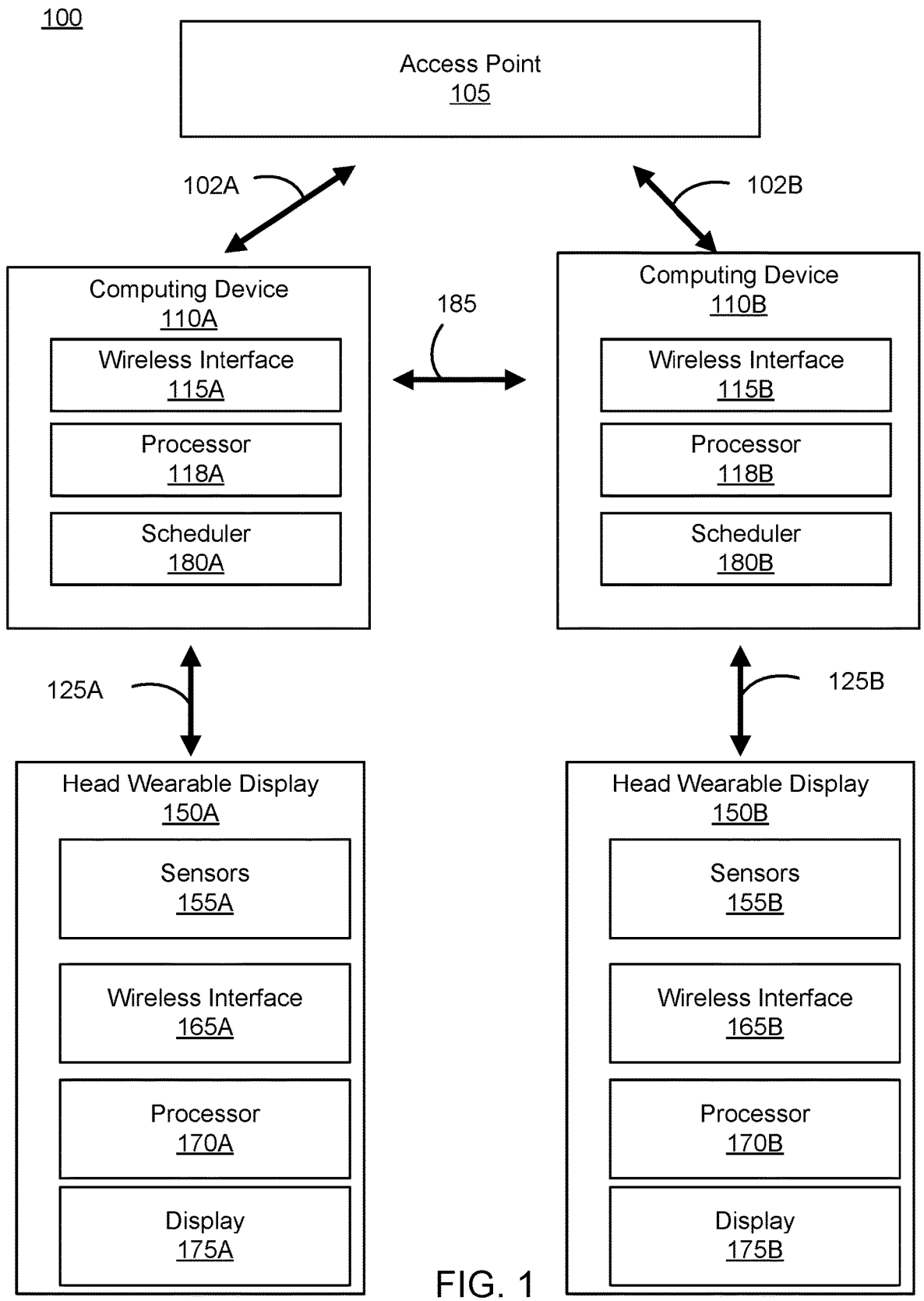
FIG. 1 is a diagram of a system environment including an artificial reality system, according to an example implementation of the present disclosure.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a computing device or a mobile device that can retrieve content from the access point 105, and can provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. Additionally or alternatively, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a field of view of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, or any wireless communication link. The wireless interface 115 may also include a component to communicate with a different computing device 110 through a wireless link 185. Examples of the wireless link 185 include a near field communication link, Wi-Fi direct, Bluetooth, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118 may configure or cause the wireless interfaces 115 to toggle, transition, cycle or switch between a sleep mode and a wake up mode. In the wake up mode, the processor 118 may enable the wireless interface 115 such that the wireless interfaces 115 may exchange data. In the sleep mode, the processor 118 may disable the wireless interface 115 (e.g., may implement low power or reduced operation) such that the wireless interfaces 115 may not consume power, or may reduce power consumption. The processors 118 may schedule the wireless interfaces 115 to switch between the sleep mode and the wake up mode periodically every frame time (e.g., 11 ms or 16 ms). For example, the wireless interfaces 115 may operate in the wake up mode for 2 ms of the frame time, and the wireless interfaces 115 may operate in the sleep mode for the remainder (e.g., 9 ms) of the frame time. By disabling the wireless interfaces 115 in the sleep mode, power consumption of the computing device 110 and the HWD 150 can be reduced or minimized.

In some embodiments, the processors 118 may configure or cause the wireless interfaces 115 to resume communication based on stored information indicating communication between the computing device 110 and the HWD 150. In the wake up mode, the processors 118 may generate and store information (e.g., channel, timing) of the communication between the computing device 110 and the HWD 150. The processors 118 may schedule the wireless interfaces 115 to enter a subsequent wake up mode according to timing of the previous communication indicated by the stored information. For example, the wireless interfaces 115 may predict/determine when to enter the subsequent wake up mode, according to timing of the previous wake up mode, and can schedule to enter the subsequent wake up mode at the predicted time. After generating and storing the information and scheduling the subsequent wake up mode, the processors 118 may configure or cause the wireless interfaces 115 to enter the sleep mode. When entering the wake up mode, the processors 118 may cause or configure the wireless interfaces 115 to resume communication via the channel or frequency band of the previous communication indicated by the stored information. Accordingly, the wireless interfaces 115 entering the wake up mode from the sleep mode may resume communication, while bypassing a scan procedure to search for available channels and/or performing handshake or authentication. Bypassing the scan procedure allows extension of a duration of the wireless interfaces 115 operating in the sleep mode, such that the computing device 110 and the HWD 150 can reduce power consumption.

In some embodiments, the computing devices 110A, 110B may coordinate operations to reduce collisions or interferences. In one approach, the computing device 110A may transmit a beacon frame periodically to announce/advertise a presence of a wireless link 125A between the computing device 110A and the HWD 150A and can coordinate the communication between the computing device 110A and the HWD 150A. The computing device 110B may monitor for or receive the beacon frame from the computing device 110A, and can schedule communication with the HWD 150B (e.g., using information in the beacon frame, such as an offset value) to avoid collision or interference with communication between the computing device 110A and the HWD 150A. For example, the computing device 110B may schedule the computing device 110B and the HWD 150B to enter a wake up mode, when the computing device 110A and the HWD 150A operate in the sleep mode. For example, the computing device 110B may schedule the computing device 110B and the HWD 150B to enter a sleep up mode, when the computing device 110A and the HWD 150A operate in the wake up mode. Accordingly, multiple computing devices 110 and HWDs 150 in proximity (e.g., within 20 ft) may coexist and operate with reduced interference.

In some embodiments, a scheduler 180 (e.g., scheduler 180A of the computing device 110A and/or scheduler 180B of the computing device 110B) may request/configure/establish/setup rTWT to transmit traffic steams identified as latency sensitive traffic. The AP 105 and scheduler 180 of the computing devices 110 may negotiate (e.g., perform a handshake process) and may establish a membership of a rTWT schedule in a TWT setup procedure. In some embodiments, when the AP 105 and the scheduler 118 are negotiating, the AP 105 may be considered a restricted TWT scheduling AP (e.g., AP) and the computing devices 110 may be considered a restricted TWT scheduled STA (e.g., STA).

In some embodiments, the HWD 150 may request to send P2P traffic to the computing device 110. Accordingly, the HWD 150 may be considered the TWT requesting STA (e.g., the TWT STA that requests the TWT agreement), and the computing device 110 may be considered a TWT responding STA (e.g., the TWT STA that responds to the TWT request). In other embodiments, the computing device 110 may request to send P2P traffic to the HWD 150 such that the computing device 110 is considered the TWT requesting STA and the HWD 150 is the TWT responding STA.

The communication link 125 between the computing devices 110 and the HWDs 150 may be a P2P link (e.g., a link used for transmission between two non-AP devices). The communication link 102 between the computing devices 110 and the AP 105 may be any channel or other type of link. In some configurations, the HWD 150 may move/become out of range from the access point 105.

The schedulers 180 of the computing devices 110 may schedule communication between the computing device(s) 110 and the HWD(s) 150 with the AP 105 such that the communication between the computing device(s) 110 and HWD(s) 150 is protected. The computing device(s) 110 may initiate such protected P2P communication with the HWD(s) 150 by indicating, to the AP 105, that the computing device(s) 110 wish to schedule P2P communication in rTWT service periods (SPs). The scheduler 180 of the computing device(s) may schedule (or negotiate) the requested rTWT SP(s).

Figure 2:
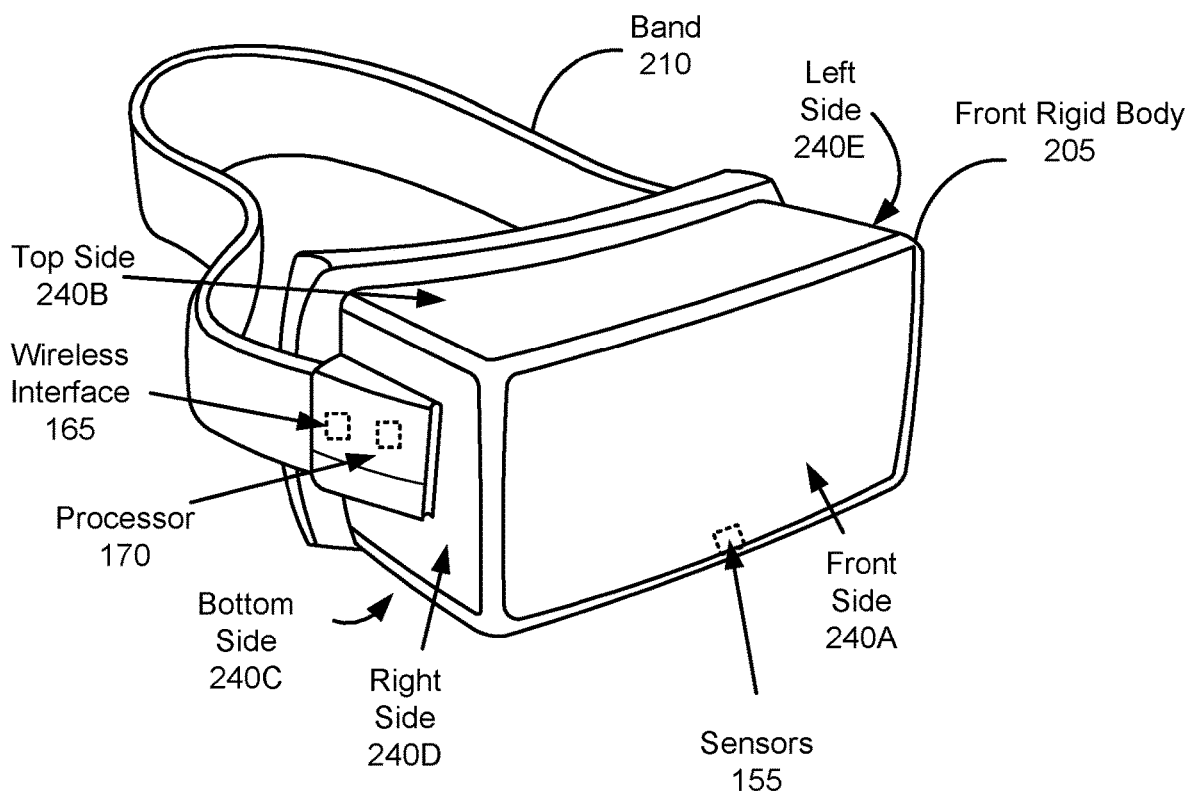
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205, a left side 240E, a front side 240A, a right side 240D, a bottom side 240C, a top side 240B, and a band 210. The front rigid body 205 includes the electronic display 175 (not shown in FIG. 2), the lens 180 (not shown in FIG. 2), the sensors 155, the eye trackers 160A, 160B, (not shown) the communication interface (wireless interface) 165, and the processor (image renderer) 170. In the embodiment shown by FIG. 2, the communication interface 165, the image renderer 170, and the sensors 155 are located within the front rigid body 205, and may not be visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
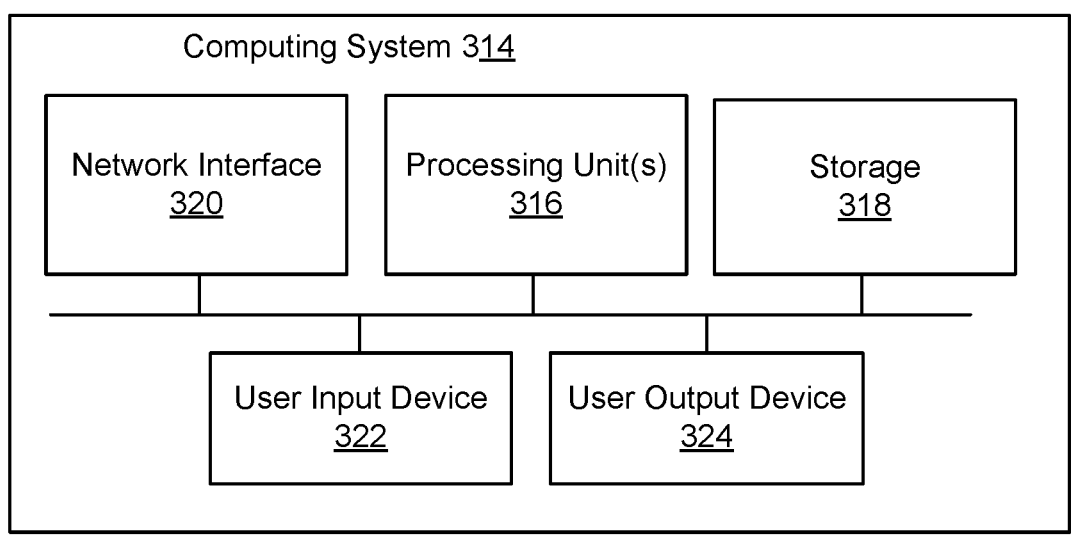
FIG. 3 is a block diagram of a computing environment, according to an example implementation of the present disclosure.

Various operations described herein can be implemented on computer systems. FIG. 3 shows a block diagram of a representative computing system 314 usable to implement the present disclosure, in accordance with an example embodiment. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests for information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

In some embodiments, a Target Wake Time (TWT) is a time agreed/negotiated upon by computing device(s) 110, access point(s) 105 and/or HWD(s) 150, or specified/configured by one of the devices (e.g., by the access point 105). During the wake time, the computing device 110 may be in an awake state (e.g., its wireless communication module/interface is in a powered-up, ready or wake state) and is able to transmit (e.g., using various contention based procedures, non-contention based procedures, and the like) and/or receive. When the computing device 110 is not awake (e.g., its wireless communication module/interface is in a powered-down, low power or sleep state), the computing device 110 may enter a low power mode or other sleep mode. The computing device 110 may exist in a sleep state until a time instance/window as specified by the TWT. The computing device 110 can wake up periodically (e.g., at a fixed, configured time interval/period/cycle) based on the TWT. The TWT reduces energy consumption of the computing device 110 by limiting the awake time and associated power consumption of the computing device 110.

A TWT may be characterized by a periodic, fixed, wake-sleep schedule. TWT may be a mechanism where a set of service periods (SPs) are defined and shared between devices to reduce medium contention and improve the power efficiency of the devices. For example, the computing device 110 can wake up periodically (e.g., at a fixed, configured time interval/period/cycle) based on the TWT. The TWT reduces energy consumption of the devices by limiting the awake time and associated power consumption of the devices.

Figure 4:
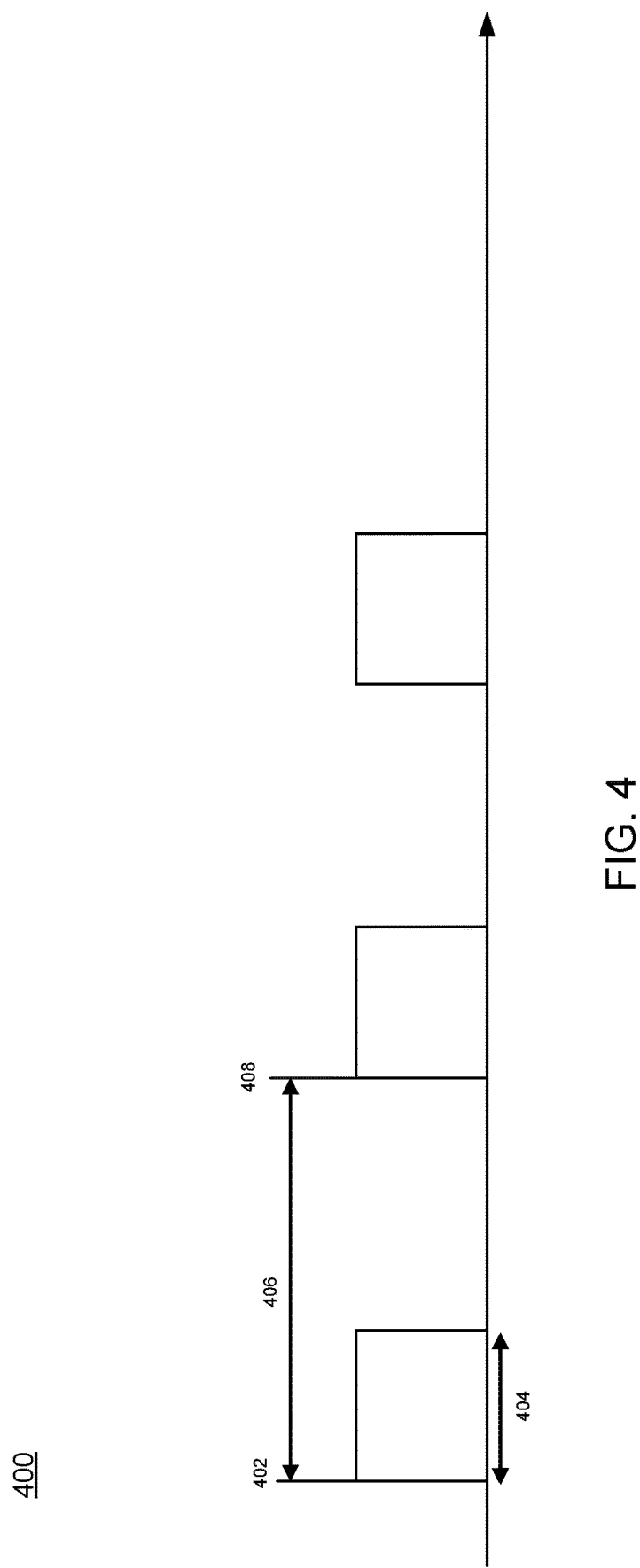
FIG. 4 is a timing diagram showing a wake-up/sleep schedule of a computing device utilizing TWT, according to an example implementation of the present disclosure.

FIG. 4 is a timing diagram 400 showing a wake-up/sleep schedule of a computing device utilizing TWT, according to an example implementation of the present disclosure. The TWT start time is indicated by the computing device 110 (e.g., a portion of its relevant modules/circuitry) waking up at 402. The computing device 110 may wake up for a duration 404 defined by a service period (SP). After the SP duration 404, the computing device 110 may enter a sleep state until the next TWT start time at 408. The interval of time between TWT start time 402 and TWT start time 408 may be considered the SP interval 406.

A TWT schedule may be communicated and/or negotiated using broadcast TWT (bTWT) and/or individual TWT (iTWT) signaling. A device (such as AP 105) may schedule TWT SPs with other devices (e.g., computing devices 110 and/or HWDs 150) and may share schedule information in beacon frames and/or probe response frames. STAs may request membership in the shared schedule (e.g., request to be assigned to part (e.g., a service period) of the shared schedule) based on the shared schedule and/or negotiate membership in the SP based on traffic considerations (e.g., latency sensitive traffic streams). Example frames that may be transmitted during a broadcast TWT SP by a TWT scheduling AP or by a TWT scheduled STA may include PS-Poll and QoS Null frames, frame exchanges for delivery of QoS data frames of TIDs indicated by the rTWT TID Bitmap subfield (as discussed herein), bandwidth query report frames (BQRs), buffer status report (BSR) frames (the TIDs in the BSR may include the TIDs indicated by the rTWT TID Bitmap subfield, as described herein), frames that may be sent as part of a sounding feedback exchange, management frames (e.g., action or action No acknowledge (ACK) frames), and control response frames.

An AP (e.g., AP 105 and/or other device operating as a soft AP/hotspot) may enhance medium access protection and resource reservation by supporting restricted TWT (rTWT). The rTWT SPs may be used to deliver latency sensitive traffic and/or any additional frame that supports latency sensitive traffic. Broadcast TWT signaling may be extended for use in scheduling/negotiation/communicating rTWT SPs. In some embodiments, during a rTWT SP, the AP and a scheduled STA may require the transmission of QoS Data frames that are latency sensitive traffic. In other embodiments, during a rTWT SP, the AP and the STA may prioritize the transmission of QoS Data frames that are latency sensitive traffic. Accordingly, instead of limiting traffic to latency sensitive traffic only during rTWT SPs (e.g., identified by TIDs in the UL/DL TID bitmaps as described herein), the AP and STA may prioritize the transmission of such traffic, and other traffic may be sent after the high priority traffic is sent.

Figure 5:
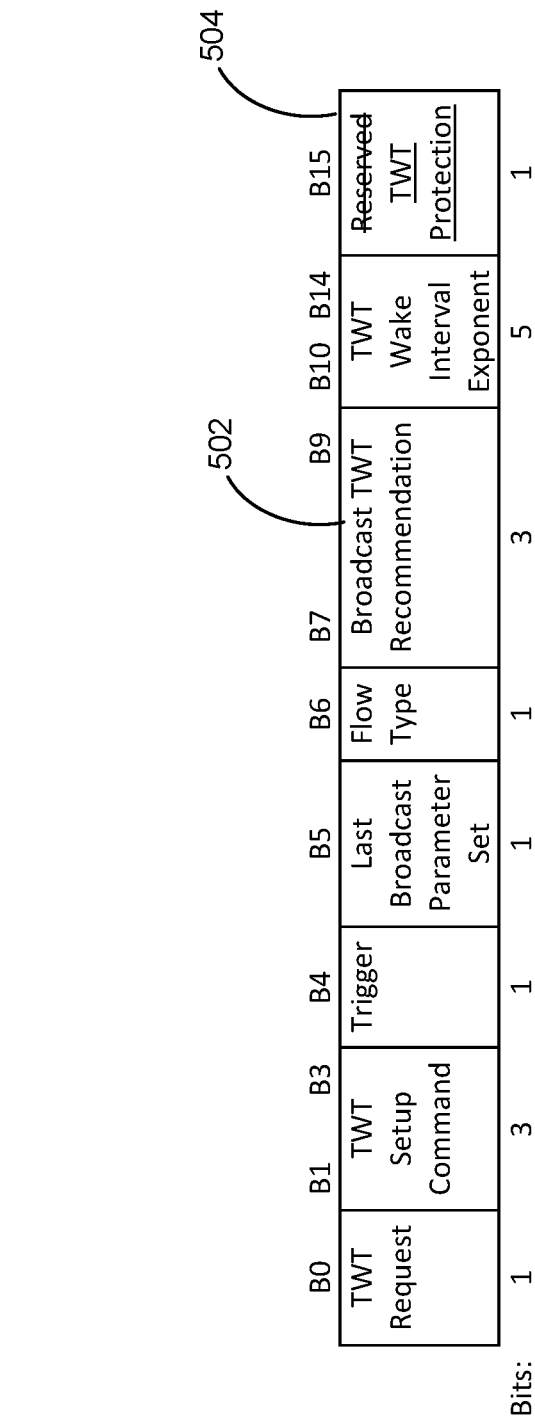
FIG. 5 is a format of a Request Type field in a Broadcast TWT Parameter Set field, according to an example implementation of the present disclosure.

FIG. 5 is a format of a Request Type field 500 in a Broadcast TWT Parameter Set field, according to an example implementation of the present disclosure. In some configurations, one or more fields are established/configured/modified/added/appended and/or repurposed to support rTWT. In some configurations, a bit may be appended to the Request Type field in the Broadcast TWT Parameter Set field. In other configurations, as indicated in 502, a broadcast TWT element in the Broadcast TWT Recommendation field may be set to 4 (or some other positive integer excluding 0-3 or other reserved bits) to indicate a rTWT schedule (or a broadcast TWT parameter set). Additionally or alternatively, as shown in 504, reserved bit-15 of the Request Type Field may be repurposed/configured/used to indicate rTWT by setting a bit in the TWT Protection subfield. The TWT Protection subfield may indicate that the start of the SP is protected. For example, setting a bit in the TWT Protection subfield may indicate that transmission opportunities within the TWT SPs may be initiated with a network allocation vector (NAV) protection mechanism, such as multi-user (or single user) request to send (RTS)/clear to send (CTS) mechanisms and/or CTS-to-self frame. In some embodiments, the TWT Protection subfield (indicated in 504) may be set together with the broadcast TWT element in the Broadcast TWT recommendation field (indicated in 502). In some configurations, bits set in Broadcast TWT signaling may remain the same value until they are changed.

Figure 6:
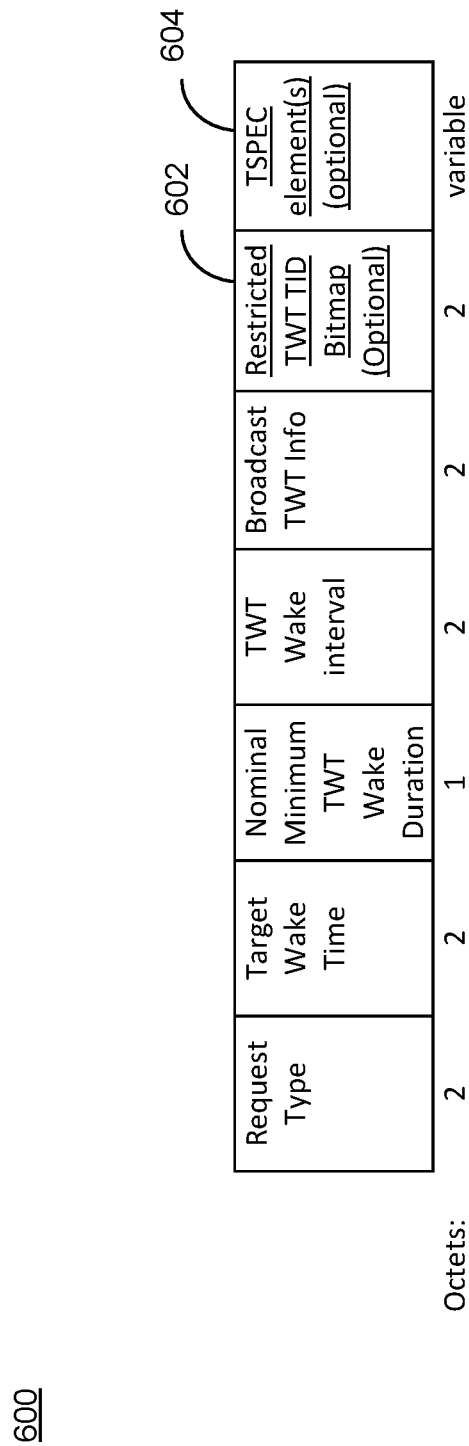
FIG. 6 is a format of a Broadcast Target Wake Time Parameter Set field, according to an example implementation of the present disclosure.

FIG. 6 shows an example of the Broadcast TWT Parameter Set Field 600, according to an example implementation of the present disclosure. The Broadcast TWT Parameter Set Field may be transmitted both ways (e.g., from AP to STA and from STA to AP), and in some cases between STAs (e.g., in peer-to-peer communications or configuration). In some configurations, fields are established/configured/modified/added/appended and/or repurposed. For example, during negotiations between an AP and STA, one or more fields of the Broadcast TWT Parameter Set Field may be optionally established/configured/modified/added/appended and/or repurposed. In one implementation, a STA may append optional fields during negotiations with an AP to the Broadcast TWT Parameter Set field, indicating latency sensitive traffic using TIDs. Optional fields that may be present in the Broadcast TWT Parameter Set Fields are indicated by 602 and optionally 604 in FIG. 6; 710, 702, 704, 706 and optionally 708 in FIG. 7, or 702, 704, 706, and optionally 708 in FIG. 7 discussed further below. In response, the AP may append/configure/modify/add the optional fields to the Broadcast TWT Parameter Set field, confirming (or rejecting) the requested schedule by the STA and/or modifying the requested schedule. In contrast, during an announcement, the one or more optional fields (indicated by 602 and optionally 604 in FIG. 6; 710, 702, 704, 706 and optionally 708 in FIG. 7, or 702, 704, 706, and optionally 708 in FIG.

7 discussed further below) of the Broadcast TWT Parameter Set Field may not be present.

As shown in 602, a rTWT traffic identifier (TID) Bitmap subfield is added to the Broadcast TWT Parameter Set field format. In some configurations, the rTWT TID Bitmap may be 2 octets (or other number of bits or octets, e.g., 8 or 14 bits) long. In other configurations, the rTWT TID Bitmap may be 1 octet (or other number of bits or octets) long. The rTWT TID Bitmap may indicate which TID(s) are identified by the scheduling AP or the scheduled STA as latency sensitive traffic for a particular schedule (e.g., a schedule indicated in the Broadcast TWT Parameter Set Field). In elements not containing information about rTWT schedules, the rTWT TID Bitmap may not be present.

In some configurations, a value of 1 (or 0) in bit position k in the bitmap may indicate TID k is identified as latency sensitive traffic, and Medium Access Control (MAC) Service Data Units (MSDUs) of TID k are allowed to be transmitted in the rTWT SP described/indicated by the Broadcast TWT Parameter Set Field. That is, the TIDs may specify latency sensitive traffic for a specific rTWT schedule. If a TID is indicated, then the traffic corresponding to the TID may be latency sensitive traffic. A value of 0 (or 1) in bit position k may indicate that TID k is not identified as latency sensitive traffic, and MSDUs of TID k are not allowed to be transmitted in the rTWT SP described by the Broadcast TWT Parameter Set Field. Each bit in the rTWT TID Bitmap subfield may indicate TIDs of both DL and UL traffic.

In some configurations, a predefined bit (e.g., bit 14, 15 or 16) of the rTWT TID Bitmap may be set to 1 (or 0) to indicate that peer-to-peer (P2P) traffic that originated from (or is going to) the scheduled STA, is identified as latency sensitive traffic, and set to 0 (or 1) otherwise. The bit indicating the P2P traffic (e.g., bit 15) may not identify TIDs because P2P traffic is between a scheduled STA and a peer STA(s). The scheduled STA may report to the AP a general indication of the presence of P2P latency sensitive traffic. In other configurations, there may be a TID bitmap for P2P traffic.

As shown in 604, a traffic specification (TSPEC) elements subfield may be added to or configured in (e.g., towards/to the end of) the Broadcast TWT Parameter Set field format. In some configurations, the TSPEC elements field may be a variable number of octets (e.g., 0 octets to 4 octets). The TSPEC elements field can contain zero, one or multiple TSPEC elements. The TSPEC elements subfield may be used to describe the characteristics and/or Quality of Service (QoS) expectations of the traffic flow(s) identified by the rTWT TID bitmap subfield. In elements not containing information about rTWT schedules, the TSPEC elements field may not be present.

A STA configured for rTWT may establish membership in rTWT schedules by negotiating with the AP. STAs that support rTWT may listen to rTWT SP announcements from the AP and obtain a rTWT SP schedule. The STA may provide its own traffic information and/or minimum QoS requirement for the rTWT setup. The AP (and/or peer STA in P2P configuration) may accept/reject/suggest the request (e.g., perform admission control) and may perform resource allocation to update the rTWT SP schedule.

Figure 7:
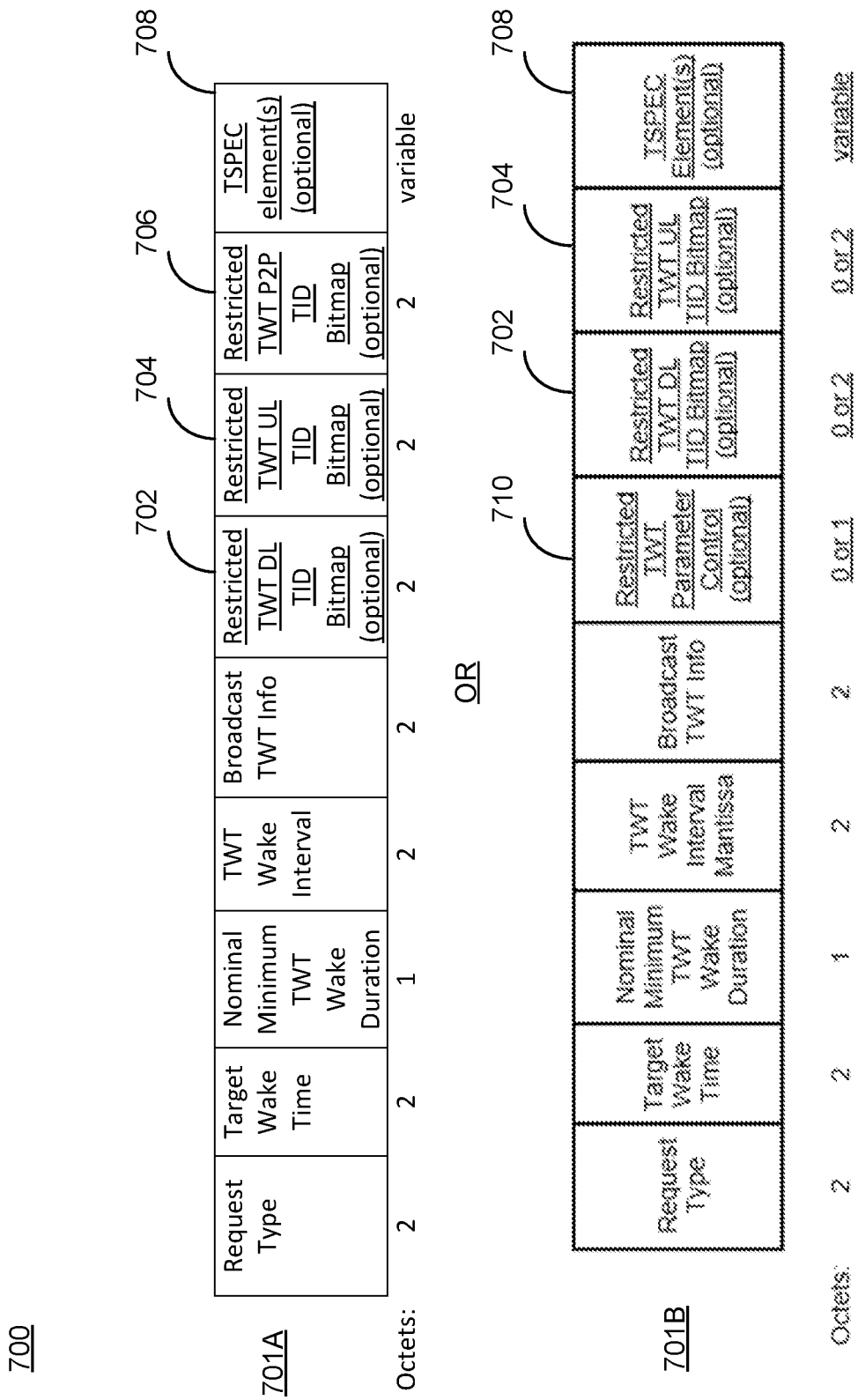
FIG. 7 shows two example formats of a Broadcast Target Wake Time Parameter Set field, according to example implementations of the present disclosure.

FIG. 7 shows two examples of the Broadcast TWT Parameter Set Field 700, according to an example implementation of the present disclosure. As shown, Broadcast TWT Parameter Set Field 701A is a first example of a Broadcast TWT Parameter Set Field 700, and Broadcast TWT Parameter Set Field 701B is a second example of a Broadcast TWT Parameter Set Field 700. Instead of a rTWT TID Bitmap (e.g., 602 in FIG. 6) indicating the TID of both DL and UL traffic, in both examples 701A and 701B, the rTWT TID Bitmap may be broken down to beneficially indicate the direction of the originating traffic. In some configurations, other bits (e.g., reserved bits and/or other fields/subfields) may be allocated for the rTWT DL TID Bitmap, rTWT UL TID Bitmap, and/or rTWT P2P TID Bitmap subfields, one or more of which may be configured in various embodiments/implementations. In some configurations, subfields may be established/configured/modified/added/appended and/or repurposed to include the rTWT DL TID Bitmap, rTWT UL TID Bitmap, and/or rTWT P2P TID Bitmap fields.

As shown in both examples 701A and 701B, 702 indicates the rTWT DL TID Bitmap subfield that can be added to the Broadcast TWT Parameter Set field format. The rTWT DL TID Bitmap may indicate the direction of the latency sensitive originating traffic. In some configurations, the DL direction is from the AP to the STA.

As shown in both examples 701A and 701B, 704 indicates the rTWT UL TID Bitmap subfield that can be added to the Broadcast TWT Parameter Set field format. The rTWT UL TID Bitmap may indicate the direction of the latency sensitive originating traffic. In some configurations, the UL direction is from the STA to the AP.

As shown in example 701A, 706 indicates the rTWT P2P TID Bitmap that can be added to the Broadcast TWT Parameter Set field format. The rTWT P2P TID Bitmap may be used to enhance the delivery of latency sensitive traffic between peer STAs. For example, P2P member STAs may transmit their latency sensitive traffic during a rTWT SP while other non-member rTWT STAs are silenced by the quiet interval. For instance, a TXOP (transmit opportunity) duration may be reserved for P2P traffic.

As shown in both examples 701A and 701B, 708 indicates the TSPEC elements subfield that may be added to the Broadcast TWT Parameter Set field format. The TSPEC elements subfield 708 may be similar in operation to the TSPEC elements subfield 604 in FIG. 6. Generally, respective ones of the TSPEC elements may correspond to respective ones of the TIDs for either the rTWT DL TID Bitmap and/or the rTWT UL TID Bitmap. In an example, given three DL TIDs indicated in the rTWT DL TID Bitmap at position $k_1$, $k_2$, $k_3$, and three UL TIDs indicated in the rTWT UL TID Bitmap at position $k_4$, $k_5$, $k_6$, then up to six TSPEC elements may be indicated in the TSPEC element subfield 604 (e.g., three TSPEC elements corresponding to the three DL TIDs and three TSPEC elements corresponding to the three UL TIDs).

As shown in example 701B, 710 indicates the rTWT Parameter control subfield that may be added to the Broadcast TWT Parameter Set field format. The rTWT Parameter control subfield beneficially maintains the size of the Broadcast TWT Parameter Set field. A subfield in the Restricted TWT Parameter Control field may indicate whether additional subfields (e.g., the rTWT DL TID Bitmap and/or the rTWT UL TID Bitmap) in the Broadcast TWT Parameter Set field are valid. If the subfields are valid, as described below, then the subfields contain/indicate useful/valid information regarding latency sensitive traffic (e.g., direction, location, TIDs). If the subfields are not valid, as described below, then the fields may contain padding or other non-useful information to maintain the size of the Broadcast TWT Parameter Set field. Accordingly, if the subfields are not valid, then the fields may be ignored. In some embodiments, if the subfields are not valid, a device (such as the AP) may suggest latency sensitive traffic (including direction, location, and TIDs), to be communicated in a schedule. The device may modify the subfields in the Broadcast TWT Parameter Set field to contain valid information and modify a corresponding valid bit indicator. For example, an AP may suggest latency sensitive traffic be communicated via a TID in a k position in a DL direction and can update the corresponding valid bit indicator, as discussed below. The rTWT Parameter control subfield is described in more detail in FIG. 8.

Figure 8:
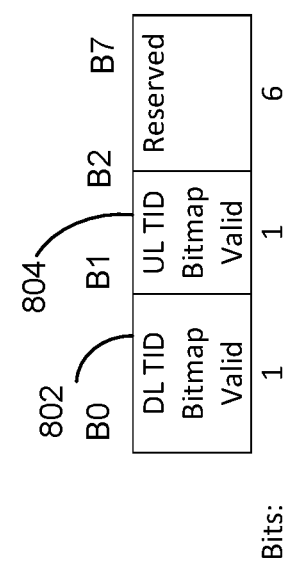
FIG. 8 shows an example format of a Restricted Target Wake Time Parameter Control subfield, according to an example implementation of the present disclosure.

FIG. 8 shows an example format of the Restricted TWT Parameter Control subfield format 800, according to an example implementation of the present disclosure. As shown in 802, a bit may be set to indicate whether the DL TID Bitmap is valid (e.g., a valid indicator bit). A set bit (e.g., the bit being a value of 1 or 0), may indicate that the DL TID Bitmap may be valid. If the bit is set, then the rTWT DL TID Bitmap field contained in the Broadcast TWT Parameter Set Field (e.g., examples 701A and 701B in FIG. 7) is valid. When the rTWT DL TID Bitmap is valid, then the bits contained in the rTWT DL TID Bitmap may indicate latency sensitive traffic. For example, bits in position k in the rTWT DL TID Bitmap may indicate that TID k in the DL direction is identified as latency sensitive traffic. If the bit is not set (e.g., the bit may be a value or 1 or 0), then the DL TID Bitmap may not be valid. If the DL TID Bitmap is not valid, then the device reading the DL TID Bitmap may ignore the bits (e.g., the bits in position k in the rTWT DL TID Bitmap do not indicate TID k in the DL direction as being latency sensitive traffic).

As shown in 804, a bit may be set to indicate whether the UL TID Bitmap is valid. A set bit (e.g., the bit being a value of 1 or 0), may indicate that the UL TID Bitmap may be valid (e.g., a valid indicator bit). If the bit is set, then the rTWT UL TID Bitmap field contained in the Broadcast TWT Parameter Set Field (e.g., examples 701A and 701B in FIG. 7) is valid. When the rTWT UL TID Bitmap is valid, then the bits contained in the rTWT UL TID Bitmap indicate latency sensitive traffic. For example, bits in position k in the rTWT UL TID Bitmap may indicate that TID k in the UL direction is identified as latency sensitive traffic. If the bit is not set (e.g., the bit may be a value or 1 or 0), then the UL TID Bitmap may not be valid. If the UL TID Bitmap is not valid, then the device reading the UL TID Bitmap may ignore the bits (e.g., the bits in position k in the rTWT UL TID Bitmap do not indicate TID k in the UL direction as being latency sensitive traffic). In some configurations, each of the fields in 702, 704, 706 and 708 may be combined. For example, the rTWT DL TID Bitmap (702) and rTWT UL TID Bitmap (704) may be combined, leaving the rTWT P2P TID Bitmap and the TSPEC elements fields. Further, it is contemplated that the locations (e.g., octet or bit locations) and/or order of these in an information element (IE) and/or Broadcast TWT Parameter Set Field may be altered and/or re-ordered from those illustrated herein.

Figure 9:
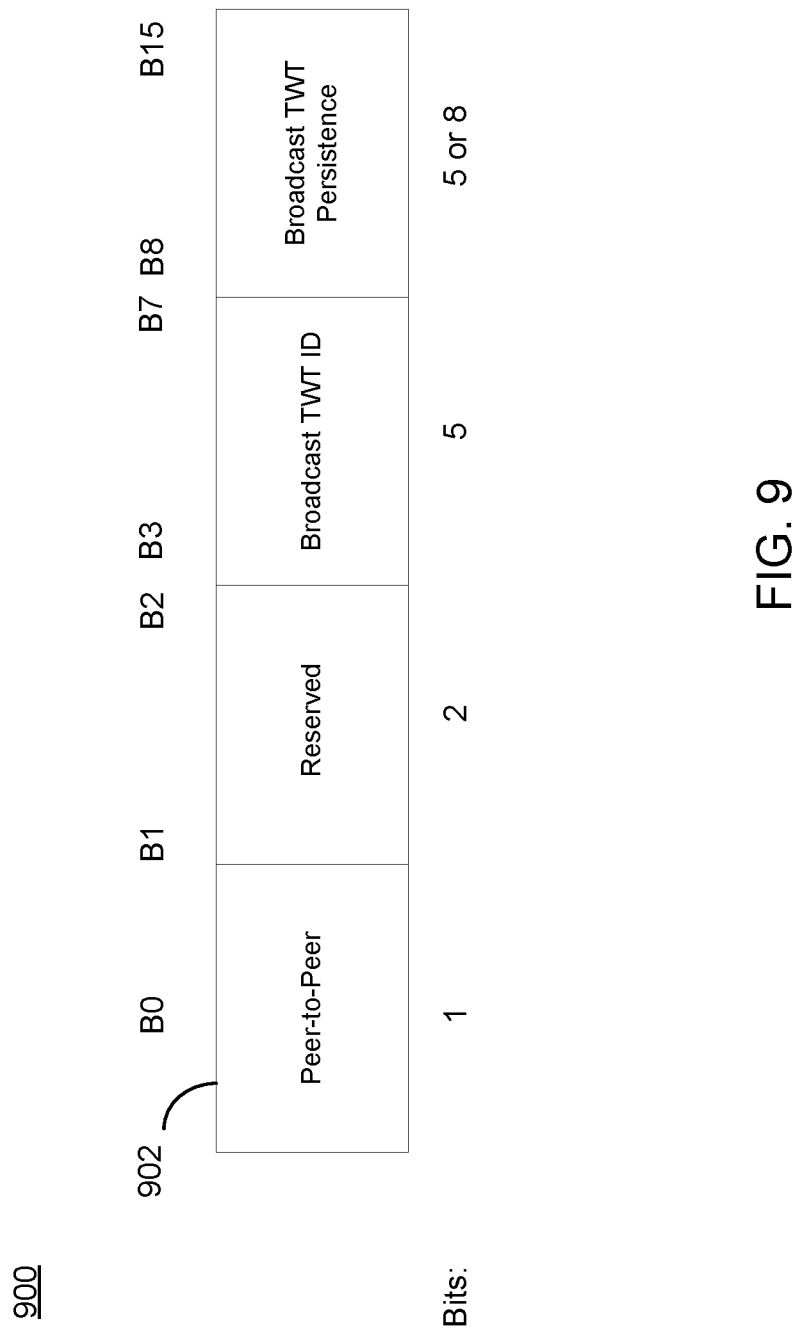
FIG. 9 shows an example format of a Broadcast TWT Info subfield of a Broadcast TWT Parameter Set field, according to an example implementation of the present disclosure.

FIG. 9 shows an example format of the Broadcast TWT Info subfield 900 of a Broadcast TWT Parameter Set field (e.g., in FIG. 6 or FIG. 7), according to an example implementation of the present disclosure. As shown in 902, a bit previously reserved may be allocated/repurposed/modified/configured for a P2P subfield. In other configurations, other bits (e.g., reserved bit(s) from within or outside the Broadcast TWT Info subfield) may be allocated/repurposed/modified/appended for the P2P subfield. In some configurations, fields may be established/configured/modified/added/appended and/or repurposed to include the P2P subfield. In some configurations, the P2P subfield may be in the Request Type field of the Broadcast TWT Parameter Set field, or located in another field (e.g., of an IE and/or Broadcast TWT Parameter Set Field).

The P2P subfield may be used to allow/configure/enable/request the rTWT setup to accept/allow traffic including traffic on P2P links. For example, P2P traffic in a particular schedule may be enabled/allowed. The P2P subfield (when included in a rTWT schedule (or broadcast TWT parameter set) transmitted by a rTWT scheduling AP) may be set to 1 (or 0) to indicate that the AP allows the rTWT scheduled STA to transmit or receive latency sensitive traffic for P2P links during rTWT SPs, and can be set to 0 (or 1) otherwise. The P2P subfield (when included in a rTWT schedule (or broadcast TWT parameter set) transmitted by a rTWT scheduling STA) may be set to 1 (or 0) to indicate that the STA intends to transmit or receive latency sensitive traffic over its P2P link as part of latency sensitive traffic to be delivered in the rTWT SPs, and can be set to 0 (or 1) otherwise.

In some configurations, the AP may announce policies that limit the types of traffic that the AP accepts for the rTWT sessions. Additionally or alternatively, the AP may limit the amount of time allowed to each rTWT session (and/or total rTWT sessions).

Figure 10:
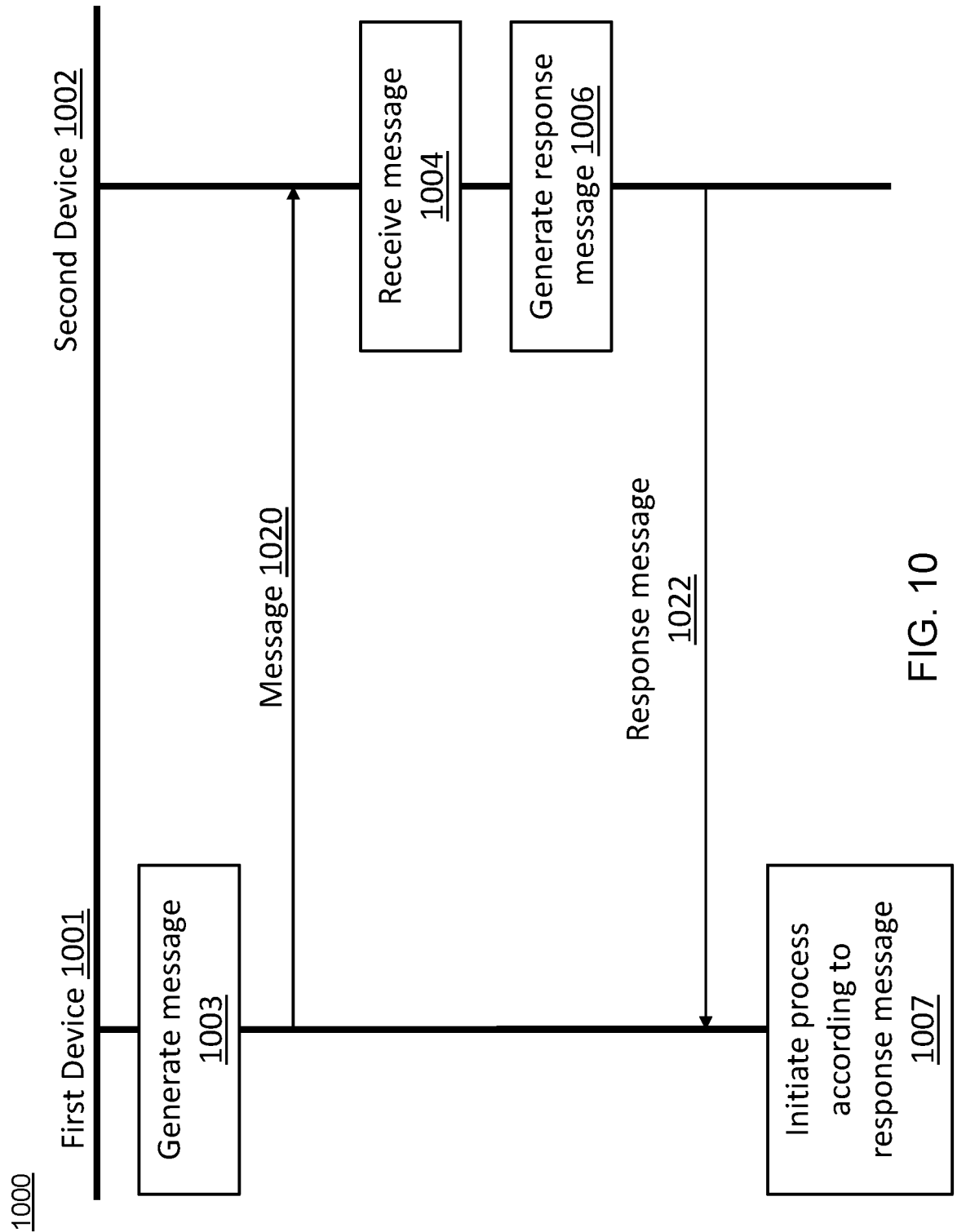
FIG. 10 is an interaction/flow diagram showing a process of configuring/enabling/extending restricted Target Wake Time in a Target Wake Time setup procedure, according to an example implementation of the present disclosure.

FIG. 10 illustrates an interaction/flow diagram showing a process 1000 of configuring/enabling/extending rTWT in a TWT setup procedure, according to an example implementation of the present disclosure. In particular, the devices in the process 1000 may be negotiating membership in a rTWT schedule. In some embodiments, the process 1000 is performed by a first device 1001 and a second device 1002. The first device 1001 and the second device 1002 may be some combination of an AP (e.g., AP 105), a soft AP, and/or a station (e.g., computing device 110). In some embodiments, the process 1000 is performed by other entities. In some embodiments, the process 1000 includes more, fewer, or different steps than shown in FIG. 10.

In more details of operation 1003, the first device 1001 may configure fields in a message, indicating a requested communication of traffic streams identified as latency sensitive traffic in a rTWT schedule. For example, the first device 1001 may request the communication of traffic streams identified as latency sensitive traffic in a particular rTWT SP. Alternatively, the first device 1001 may accept/approve (or modify/reject) a request (e.g., from a second device 1002) of the communication of the traffic streams identified as latency sensitive traffic in a particular rTWT SP. The message may be a message in bTWT signaling. One field (e.g., a first field) in the message may indicate that the bTWT signaling is being used for rTWT. As discussed with reference to FIG. 5, a broadcast TWT element in the Broadcast TWT Recommendation field indicated by 502 may be set to 4 (or some other defined value) to indicate a rTWT schedule (or broadcast TWT parameter set). Additionally or alternatively, a TWT Protection bit indicated by 504 may indicate a rTWT schedule (or broadcast TWT parameter set).

Another field (e.g., a second field) in the message may indicate (i) one or more traffic streams that are latency sensitive. A subfield in the second field may indicate TIDs corresponding to the latency sensitive traffic. As described with reference to FIG. 6, a rTWT traffic identifier (TID) Bitmap subfield indicated by 602 may be added/repurposed to the Broadcast TWT Parameter Set field format 600. The rTWT TID Bitmap may indicate which TID(s) are associated with latency sensitive traffic. Additionally or alternatively, with reference to FIG. 7, the rTWT DL TID Bitmap 702 and/or the rTWT UL TID Bitmap 704 may indicate which TIDs are associated with latency sensitive traffic.

In some embodiments, the second field in the message may indicate (ii) a direction of each of the one or more traffic streams identified as latency sensitive traffic streams during the particular SP. A subfield in the second field may indicate a direction of the traffic streams identified as latency sensitive traffic streams during the particular SP. For example, referring to FIG. 7, the rTWT DL TID Bitmap 702 and the rTWT UL TID Bitmap 704 may indicate the direction of the originating traffic streams.

In some embodiments, a subfield in the second field may indicate whether one or more subfields in the second field are valid. For example, referring to FIG. 7, the rTWT Parameter Control field may indicate whether the rTWT DL TID Bitmap and/or rTWT UL TID Bitmap contain valid information. Specifically, the subfield may include a valid indicator bit corresponding to subfields containing valid/invalid information. For example, referring to FIG. 8, the valid bit indicators indicated in 802 and 804 of the rTWT Parameter Control field indicate whether the rTWT DL TID Bitmap and/or rTWT UL TID Bitmap contain valid information.

In some embodiments, a subfield in the second field may include a TSPEC element describing the characteristics of traffic streams identified as latency sensitive traffic in the SP. Referring to FIGS. 6 and 7, the TSPEC elements subfield (e.g., 604 in FIGS. 6 and 708 in FIG. 7) can describe QoS characteristics of the traffic streams identified as latency sensitive traffic.

In some embodiments, a subfield in the second field may indicate a use of P2P communication. For example, referring to FIG. 7, the rTWT P2P TID Bitmap may indicate whether P2P traffic is requested (e.g., by the first device) and/or enabled (indicated in the P2P subfield in FIG. 9) (e.g., enabled for the second device).

In more details of operation 1020, the first device 1001 may transmit the message to the second device 1002. For example, the first device 1001 may transmit the message as part of a handshake process.

In more details of operation 1004, the second device 1002 may receive the message transmitted by the first device 1001. The second device 1002 may extract information from the message. In operation 1006, the second device 1002 may generate a response message in response to the received information extracted from the message. In some embodiments, the response message may be similar to the message (e.g., structurally, operationally). For example, in some embodiments, an AP (e.g., second device 1002) may generate a response message in response to the message, approving the STA (e.g., first device 1001) to transmit the traffic streams identified as latency sensitive traffic streams during a particular SP. The AP may approve the message by generating a response message that is similar to the message (e.g., copies the message with the configured subfield(s), matches the message with the configured subfield(s)). In an example, if the second device 1002 is an AP, the second device 1002 may schedule downlink traffic (or peer-to-peer traffic) to be transmitted from the first device 1001 (e.g., a STA). In another example, if the second device 1002 is a STA, the second device 1002 may schedule uplink traffic (or peer-to-peer traffic) to be transmitted from the first device 1001 (e.g., an AP, a different STA).

In other embodiments, the response message generated in operation 1006 may be different from the message (e.g., structurally, operationally). If the response message does not match the message received by the second device 1002, the second device 1002 may be rejecting the requested traffic streams identified as latency sensitive to be communicated in the rTWT schedule, suggesting alternate traffic streams identified as latency sensitive traffic streams to be communicated in the rTWT schedule, and/or modifying one or more other parameters in the rTWT schedule (e.g., time allocated, SP interval, etc.).

The response message may be partially rejected (or modified), rejecting (or modifying/suggesting) one or more parameters of the message generated in operation 1003 such as one or more requested traffic streams identified as latency sensitive to be communicated in the rTWT schedule. The response message may also be wholly rejected (or modified), rejecting (or modifying/suggesting) all parameters of the message generated in operation 1003 such as all requested traffic streams identified as latency sensitive to be communicated in the rTWT schedule. For example, the second device 1002 may wholly reject requested traffic streams identified as latency sensitive if the schedule in which the first device 1001 wanted to communicate the traffic streams is full (e.g., and cannot accept/include/schedule an additional traffic stream). In this case, the second device 1002 may suggest an alternate schedule for the first device 1001 to communicate the traffic streams identified as latency sensitive.

In more details of operation 1022, the second device 1002 may transmit the response message to the first device 1001. In more details of operation 1007, the first device 1001 may receive, from the second device 1002, the response message. The response message may be received in response (in part) to the message communicated to the second device 1002 in operation 1020. The first device 1001 may extract information from the response message. For example, the first device 1001 may compare one or more portions of the response message to the message generated in operation 1003 to determine whether the traffic streams identified as latency sensitive traffic streams during the particular SP are partially/completely approved, rejected, and/or modified. If the response message matches the message, then the first device 1001 may determine that the traffic streams identified as latency sensitive traffic streams during the particular SP latency are approved for transmission during the SP. Moreover, the first device 1001 may determine that the first device 1001 and the second device 1002 have agreed to one or more other parameters that may have been present in the message generated at 1003 (e.g., time allocated/SP interval).

If the response message partially matches, then the first device 1001 may determine that the portions of the response message matching the message indicate approval. For example, a portion of the response message that partially matches may indicate that the traffic streams identified as latency sensitive traffic streams during the particular SP are approved for transmission during the SP. The portions of the response message that do not match may indicate a disagreement (e.g., a rejection, modification, and/or suggestion of one or more parameters). For example, a portion of the response message that does not match may indicate a rejection of the traffic streams identified as latency sensitive traffic streams during the particular SP. As discussed herein, in some embodiments, the portions of the response message that do not match may indicate a suggestion/recommendation to communicate the traffic streams identified as latency sensitive traffic in a different SP.

Referring back to operation 1007, the first device 1001 may initiate a process according to the response message. For example, the first device 1001 may schedule the traffic streams identified in the response message as latency sensitive traffic streams (e.g., approved/accepted by the second device 1002 in the request message as latency sensitive traffic streams), to time slots that are prioritized, and may communicate these traffic streams with priority. Communicating the traffic streams as prioritized (or latency sensitive) traffic streams may include/encompass transmitting the traffic streams using prioritized slot(s), prioritized time duration (s), prioritized medium access mechanisms, prioritized symbols, prioritized carrier(s), and the like. That is, the first device 1001 may differentiate the prioritized traffic stream from a regular traffic stream. Additionally or alternatively, the first device 1001 may prepare a subsequent message to be transmitted to the second device 1002 approving/rejecting/modifying one or more portions of the response message received by the first device 1001.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

The invention claimed is:

1. A method comprising:
    generating, by a first wireless communication device, a message including a first field indicating (i) one or more traffic streams that are latency sensitive, and (ii) a direction of each of the one or more traffic streams between the first wireless communication device and a second wireless communication device, each of the one or more traffic streams to be communicated during a respective service period of a restricted target wake time (rTWT) schedule; and
    sending, by the first wireless communication device to the second wireless communication device, the message including the first field,
    wherein the first field includes a first bitmap indicating one or more traffic identifiers that correspond to one or more latency sensitive traffic streams in a first communication direction from the first wireless communication device to the second wireless communication device, and a second bitmap indicating one or more traffic identifiers that correspond to one or more latency sensitive traffic streams in a second communication direction from the second wireless communication device to the first wireless communication device.

2. The method of claim 1, wherein the message includes a second field that is set to a predefined value to indicate that the first field is included in the message.

3. The method of claim 1, wherein the first field is for use by the first wireless communication device and the second wireless communication device to negotiate membership in the rTWT schedule.

4. The method of claim 1, wherein a subfield in the first field indicates whether one or more additional subfields in the first field include valid information.

5. The method of claim 4, wherein the subfield comprises a valid indicator bit corresponding to a subfield of the one or more additional subfields.

6. The method of claim 1, wherein a subfield in the field comprises a traffic specification element describing one or more characteristics of a first traffic stream of the one or more traffic streams.

7. The method of claim 1, wherein the first field indicates a use of peer-to-peer communication.

8. A first wireless communication device comprising:
    at least one processor configured to generate a message including a first field indicating (i) one or more traffic streams that are latency sensitive, and (ii) a direction of each of the one or more traffic streams between the first wireless communication device and a second wireless communication device, each of the one or more traffic streams to be communicated during a respective service period of a restricted target wake time (rTWT) schedule; and
    a transceiver configured to send the message including the first field to the second wireless communication device,
    wherein the first field includes a first bitmap indicating one or more traffic identifiers that correspond to one or more latency sensitive traffic streams in a first communication direction from the first wireless communication device to the second wireless communication device, and a second bitmap indicating one or more traffic identifiers that correspond to one or more latency sensitive traffic streams in a second communication direction from the second wireless communication device to the first wireless communication device.

9. The first wireless communication device of claim 8, wherein the message includes a second field that is set to a predefined value to indicate that the first field is included in the message.

10. The first wireless communication device of claim 8, wherein the first field is for use by the first wireless communication device and the second wireless communication device to negotiate membership in the rTWT schedule.

11. The first wireless communication device of claim 8, wherein a subfield in the first field indicates whether one or more additional subfields in the first field include valid information.

12. The first wireless communication device of claim 11, wherein the subfield comprises a valid indicator bit corresponding to a subfield of the one or more additional subfields.

13. The first wireless communication device of claim 8, wherein a subfield in the field comprises a traffic specification element describing one or more characteristics of a first traffic stream of the one or more traffic streams.

14. The first wireless communication device of claim 8, wherein the first field indicates a use of peer-to-peer communication.

15. A method comprising:
receiving, by a second wireless communication device from a first wireless communication device, a message including a first field,
wherein the first field is configured to indicate (i) one or more traffic streams that are latency sensitive, and (ii) a direction of each of the one or more traffic streams between the first wireless communication device and a second wireless communication device, each of the one or more traffic streams to be communicated during a respective service period of a restricted target wake time (rTWT) schedule,
wherein the first field includes a first bitmap indicating one or more traffic identifiers that correspond to one or more latency sensitive traffic streams in a first communication direction from the first wireless communication device to the second wireless communication device, and a second bitmap indicating one or more traffic identifiers that correspond to one or more latency sensitive traffic streams in a second communication direction from the second wireless communication device to the first wireless communication device.

16. The method of claim 15, wherein the message includes a second field that is set to a predefined value to indicate that the first field is included in the message.

* * * * *